United States Patent
Fauchere et al.

(10) Patent No.: US 11,422,814 B2
(45) Date of Patent: Aug. 23, 2022

(54) AUTOMATION OF SEQUENCES OF ACTIONS

(71) Applicant: ADOBE INC., San Jose, CA (US)

(72) Inventors: Patrick Fauchere, Basel (CH); Christian Meyer, Mulhouse (FR)

(73) Assignee: ADOBE INC., San Jose, CA (US)

( * ) Notice: Subject to any disclaimer, the term of this patent is extended or adjusted under 35 U.S.C. 154(b) by 15 days.

(21) Appl. No.: 17/038,525

(22) Filed: Sep. 30, 2020

(65) Prior Publication Data

US 2021/0011718 A1 Jan. 14, 2021

Related U.S. Application Data

(63) Continuation of application No. 15/841,604, filed on Dec. 14, 2017, now Pat. No. 10,831,486.

(51) Int. Cl.
*G06F 9/30* (2018.01)
*G06F 9/455* (2018.01)

(52) U.S. Cl.
CPC ........ *G06F 9/3017* (2013.01); *G06F 9/45512* (2013.01)

(58) Field of Classification Search
CPC .. G06F 9/3017; G06F 9/45512; G06F 9/3895; G06F 11/263
See application file for complete search history.

(56) References Cited

U.S. PATENT DOCUMENTS

| | | |
|---|---|---|
| 2005/0154999 A1 | 7/2005 | Wugoski |
| 2009/0070856 A1 | 3/2009 | Sakakibara |
| 2009/0144625 A1 | 6/2009 | Muller et al. |
| 2009/0183124 A1* | 7/2009 | Sridhar ............... G06F 3/048 715/847 |

* cited by examiner

*Primary Examiner* — Phuong H Nguyen
(74) *Attorney, Agent, or Firm* — Shook, Hardy & Bacon LLP (57) ABSTRACT

Traditional manual macro-recorders may not work under a dynamically changing operating environment. Technical solutions are disclosed to automatically generate macros to increase productivity. After a new sequence of actions is detected, the system will prompt the user with the information of an existing macro if the existing macro contains a similar sequence. Otherwise, the system will attempt to automatically generate a new macro based on the sequence of actions.

20 Claims, 5 Drawing Sheets

AUTOMATION OF SEQUENCES OF ACTIONS

CROSS-REFERENCE TO RELATED APPLICATIONS

This application is a continuation of and claims priority from U.S. application Ser. No. 15/841,604, filed Dec. 14, 2017, entitled "AUTOMATION OF SEQUENCES OF ACTIONS," which is assigned or under obligation of assignment to the same entity as this application, the entire contents of each application being herein incorporated by reference.

BACKGROUND

Automation refers to technology to perform a process without human assistance. Automation has been practiced in practically every kind of manufacturing process, particularly since the Industrial Revolution. Nowadays, computers usually serve as a critical component to control automated processes. Sometimes, operators interact with computer systems in repetitive actions, which themselves may also be automated.

A macro-recorder is a piece of software to record a user's interactions with computer systems. The recorded actions may be played back by the author or other users. In this way, many users can perform repeatable, complex actions without computer programming. By way of example, most word processors have built-in macro-recorders to facilitate users to automate user's actions to some extent.

Traditional macro-recorders may work well in a relatively static environment. Users may control when and what to record, and macro-recorders oftentimes just record mouse and keyboard functions without analyzing the operating environment for user actions. It is problematic to play back such macros if the operating environment changes. Further, it is a challenge to train users to properly record macros in today's increasingly dynamic and collaborative computing environment with cloud computing.

SUMMARY

Embodiments of the present disclosure relate to systems and methods for automation of sequences of actions. As such, one aspect of the present disclosure is to detect a sequence of actions related to a user on a computing system. Another aspect of the present disclosure is to measure the similarity of two sequences of actions. Yet another aspect of the present disclosure is to search macros similar to the detected sequence of actions. Yet another aspect of the present disclosure is to automatically generate a macro based at least in part on the detected sequence of actions.

As described in embodiments herein, technical solutions are provided to automatically generate macros to provide consistent quality and increase productivity for a process. In various embodiments, if a similar sequence of actions is found in a macro repository, the system will prompt the user with the information of the existing macro. The system will consider various characteristics of two sequences of actions for similarity measurement, such as the nature of the actions, the complexity of the actions, and the order of the sequence of actions. Otherwise, the system will attempt to automatically generate a new macro based on the sequence of actions. To evaluate whether to generate a new macro, the system will evaluate the sequence of actions for its frequency, duration, complexity, etc.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments will be readily understood by the following detailed description in conjunction with the accompanying drawings.

DETAILED DESCRIPTION

Cloud computing is a modern computing model enabling ubiquitous access to shared pools of resources, including computer networks, servers, storage, applications, and services. Resources are shared on a cloud computing platform. Applications and services may be dynamically updated and rapidly provisioned with minimal management effort. Users may collaborate in creating and accessing content. Unlike traditional, relatively static desktop computing environments, cloud computing relies on the dynamics of sharing resources to achieve coherence, consistency, and economy of scale.

Many user interactions with a computer system are repetitive. Traditional macro-recorders are designed to work in a relatively static environment, e.g., the traditional desktop computing model. Users may control when and what to record in a macro, so that the macro may be played back in the same computing environment. It is problematic to record and play back such macros in a dynamically changing cloud computing environment. Further, it is a challenge to train users to properly record macros in dynamic and collaborative computing environments. Even further, individually recorded macros cannot be easily shared.

In this disclosure, technical solutions are provided to automate sequences of actions performed by users on a computing system. The technical solutions disclosed herein are not limited to, but can be implemented with the cloud computing, such as Adobe Marketing Cloud® or a content management system. Embodiments of the present disclosure include a system for automation of sequences of actions and related processes for automatically generating macros. To this end, sequences of actions are detected by the system. If a sequence of action is qualified to form a new macro, the system will automatically generate the new macro. The new macro may be shared or reused by other users.

At a high level, and as described in reference to illustrative embodiments, actions are tagged with a complexity score or weight. The system keeps track of sequences of actions associated with attributes such as frequency, duration, and complexity. The system determines the qualification for a sequence to be persisted as a macro based on thresholds for various attributes such as the frequency, the duration, and the complexity of the sequence. If a sequence is qualified as a candidate for a new macro, the system may further solicit a validation from the user. If the user rejects the generation of the new macro, the system may adjust the thresholds for qualification accordingly, e.g., increasing one or more thresholds. Otherwise, the system may generate the new macro to be used by the same user or other users in the future. Further, as the system evolves and resources are dynamically reconfigured, macros may also be automatically updated by the system.

In one implementation, the system identifies sequences of actions often executed by a user. When a new sequence is identified and qualified to become a macro based on, e.g., the frequency, the proximity with known sequences, the average duration, or the complexity of the sequence, a new macro may be generated with a label and a description based on the actions of the sequence. A keyboard shortcut is designated for the newly generated macro. Afterwards, the system may suggest the keyboard shortcut of an existing macro when it identifies that any user has performed or likely is performing a known sequence of actions included in the existing macro. To accomplish that, the system will measure the similarity between the newly detected sequence of actions and the existing sequence of actions in the macro, e.g., based on various similarity criteria, which will be further discussed in connection with various figures herein.

In summary, the disclosed technical solutions provide various advantages. Users are no longer required to manually record macros for their individual workflow. Instead, the system automatically detects and generates macros. The system-generated macros are shared by other users to reduce operation complexity and time, reduce labor costs and expenses, increase system-wide throughput or productivity, and improve consistency and quality of processes or work products. Further, the system may update macros as the system evolves and resources are dynamically reconfigured.

Various terms are used throughout this description. Definitions of some terms are included below to provide a clearer understanding of the ideas disclosed herein.

The term "action" or "user action" refers to any operation performed by a user to interact with the computing system. User actions are meant to trigger the execution of software codes via an act of the user, such as clicking on a link or button via a user interface interaction, issuing a command via a command console, etc. Actions usually are predefined, such as standard action types defined by system developers for the most basic use cases.

The term "sequence" refers to a sequence of actions. A sequence is a chain of multiple actions, which result in a change in the system, such as a database update, either local or remote. A sequence usually involves an order of the involved actions. Accordingly, two sequences may be differentiated not only based on the actions involved, but also the order of the involved actions.

The term "macro" generally refers to a rule or pattern that specifies how a certain input sequence (e.g., a keyboard shortcut, or a menu item) should be mapped to a replacement output sequence (e.g., a sequence of actions). As used herein, the term "macro" specifically refers to reusable sequences of actions that are recognized by the computer system. A macro includes at least one sequence of actions. In some embodiments, a macro includes two or more sequences of actions. Each sequence of action can independently perform a function, and all sequences of actions in a macro can collectively perform a more complex function. A macro has its title, description, and many other metadata fields.

Figure 1:
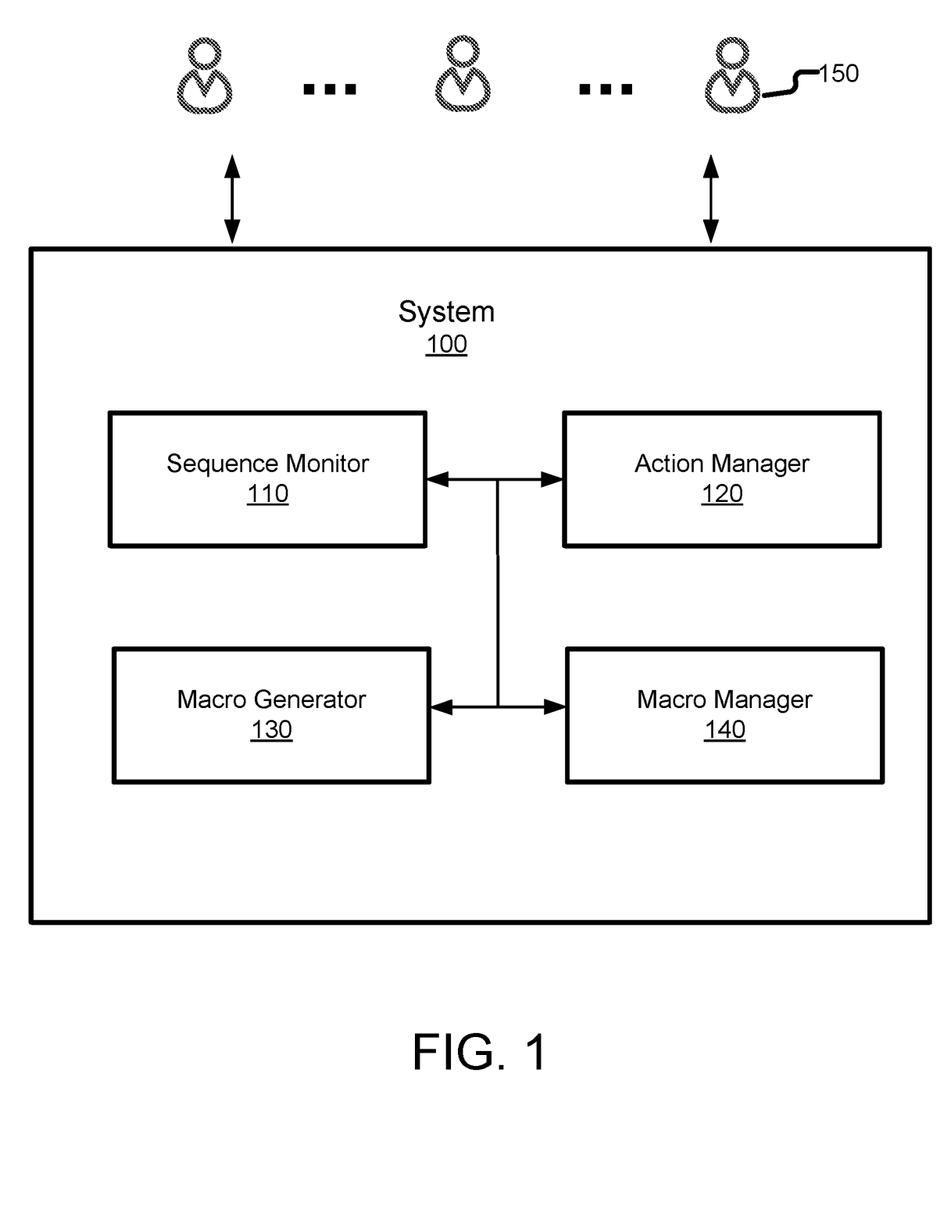
FIG. 1 is a schematic diagram illustrating an example implementation of a system for automation of sequences of actions, incorporating aspects of the present disclosure, in accordance with one embodiment.

Referring now to FIG. 1, a schematic diagram illustrates an example implementation of a system for automation of sequences of actions. In accordance with various embodiments, users 150 interact with system 100 via various user actions. As illustrated in FIG. 1, the system for automation of sequences of actions includes sequence monitor 110, action manager 120, macro generator 130, and macro manager 140, operatively coupled with each other.

Action manager 120 enables system 100 to store, retrieve, search, or update properties of actions. Various properties of actions may be used to verify whether a form of user interaction with the system is a recognizable action. Actions are tagged with a complexity score in some embodiments. Actions have labels and many other properties, which will be further discussed in connection with FIG. 2. Actions and their properties usually are predefined by system developers for common use cases, such as standard action types defined for editing an image in a content management system. Actions and their properties may also be defined by system developers or users for customized use cases for a specific user or a group of users.

Sequence monitor 110 detects actions performed by a user. User actions trigger software codes to be executed either locally on the user's computer or remotely on a remote computer. In some embodiments, sequence monitor 110 has a local agent installed on the client's computer to monitor each action in real time. In some embodiments, sequence monitor 110 will detect and analyze the involved actions whenever the software codes on the remote computer are called to execute.

Sequence monitor 110 will inquire action manager 120 to verify whether the characteristic of the invoked software codes meets the predefined characteristics of an action. Not every user interaction will be confirmed as a recognizable action by action manager 120. By way of example, an accidental user interaction that triggered the return of an error code will not be confirmed as a valid user action by action manager 120.

However, if an action is confirmed, sequence monitor 110 will further analyze the relationship of the newly detected action and any actions detected previously to determine whether two sequential actions may be put together into a temporary sequence. The newly detected action may be the beginning of a new sequence or a continuance of the ongoing sequence. Sequence monitor 110 has predefined rules to delineate whether two actions may be executed sequentially because some actions cannot be mixed in a sequence. In one embodiment, if two sequential actions cannot be linked for a common task, sequence monitor 110 will treat the most recent action as the beginning of a new sequence. Sequence monitor 110 may look at the timing of two sequential actions. In one embodiment, if the time lag between two actions is greater than a predefined threshold, sequence monitor 110 will treat the most recent action as the beginning of a new sequence. Sequence monitor 110 may analyze the user identities associated with two sequential actions. In one embodiment, if the user identities change between the two sequential actions, sequence monitor 110 will not treat the two sequential actions as one sequence. In another embodiment, sequence monitor 110 will treat actions performed by collaborative users as a multi-user sequence. In various embodiments, sequence monitor 110 may determine a sequence based on various other rules.

Once a sequence is detected, sequence monitor 110 will identify various properties associated with the sequence, such as the frequency of the sequence being performed by the same user or other users, the duration of the sequence, the complexity of the sequence, the location of performing the sequence, the collaborative users involved in the sequence, the project associated with the sequence, the user preference of the user who performed the sequence, and so forth. These and other properties of sequences are further discussed in connection with FIG. 3.

A sequence requires two or more actions. Whenever a newly confirmed action is added to the sequence, sequence monitor 110 will update the properties of the sequence. Subsequently, sequence monitor 110 queries macro manager 140 whether the sequence matches any existing macro. Macro manager 140 compares the sequence with another sequence defined in an existing macro based on various similarity measurements. In some embodiments, macro manager 140 compares two sequences based at least in part on their cosine similarity score. In some embodiments, macro manager 140 compares two sequences based at least in part on their edit distance score. In various embodiments, macro manager 140 considers the various properties of actions (e.g., complexity) and the various properties of the sequences (e.g., the order of actions) in evaluating similarity between two sequences.

If an existing macro with a similar sequence is identified, macro manager 140 may prompt the user with information of the existing macro, such as the description of the macro and the keyboard shortcut of the macro. In this way, the user may use the keyboard shortcut to perform the whole sequence of actions in the future. In one embodiment, macro manager 140 performs a partial match between a newly detected sequence and an existing macro. In this way, macros having similar sequences of actions in the beginning, middle, or end of the macro may all be returned as candidate macros for the user to choose.

However, if no existing macro is found, or the user requests to create a new macro, macro generator 130 will then determine whether the sequence is qualified to be recorded as a new macro. To this end, macro generator 130 determines the qualification for a sequence to be persisted as a macro based on thresholds for various properties of the sequence, such as the frequency, the duration, and the complexity of the sequence.

In one embodiment, if a sequence is qualified as a candidate for a new macro, macro generator 130 may nonetheless solicit a validation from the user. If the user rejects the generation of the new macro, macro generator 130 may adjust the thresholds for qualification accordingly, e.g., increasing one or more thresholds. By way of example, the user may reject to generate a new macro because the user believes that the sequence has been used infrequently. Macro generator 130, in this case, may heuristically increase the frequency requirement for generating a new macro for the user.

Otherwise, if the user approves the proposal to generate the new macro, macro generator 130 will generate the new macro based on the sequence. Macro generator 130 may assign a label and a description to the new macro based on the properties of the sequence and the properties of actions in the sequence. Macro generator 130 may assign the macro into a menu that may be invoked via a user interface to prompt users to use macros. Further, macro generator 130 may assign a keyboard shortcut to the newly generated macro so the user may invoke the macro quickly. The process of generating a new macro is further discussed in connection with FIG. 3 and FIG. 4.

In some embodiments, macro manager 140 may allow the macros generated by macro generator 130 to be used by any users who may be benefited to use such macros to improve productivity. In other embodiments, macro manager 140 may limit the access privilege of a macro to the original user or users related to the original user in a group. Users may be allowed to set the access privilege during or after the generation of the macro.

Traditionally, a sequence of actions is performed by a single user. System 100, as disclosed herein, monitors actions from users 150 and can automatically generate macros from multi-user sequences. In a collaborative environment, multi-user sequences usually have higher complexity compared to traditional single-user sequences. Users involved in a multi-user sequence may have different access privileges to resources. One user's action may be conditioned on another user's action. Resultantly, the order of actions in a multi-user sequence may be critical to secure the execution of the multi-user sequence. System 100 may capture the dynamics of multi-user sequences and encode user identities and privileges into a macro. When the multi-user macro is played back, macro manager 140 may enable each action to be executed with the same privilege inherited from the original user.

Further, as the system evolves, users change, or resources are reconfigured, macro manager 140 may dynamically update existing macros. By way of example only, if an action in a macro becomes unavailable, macro manager 140 may substitute the unavailable action with another action with equivalent function. Similarly, if a piece of resource becomes unavailable, macro manager 140 may substitute it with another piece of equivalent resource. When a piece of software is updated, macro manager 140 may have to adjust the order to execute the sequence of actions in a macro accordingly. In some embodiments, macro manager 140 may replace a stale macro with another newly formed macro if they perform substantially the same function. Macro manager 140 may also combine multiple existing macros to form a new macro for comprehensive functions. In general, macro manager 140 uses advantages of cloud computing to dynamically reconfigure macros as the computing environment changes.

In some embodiments, system 100 is a server computing device and/or service, such as a server and/or a service provided in a computing cloud, and interacts with other servers and/or services as well as various users. In alternative embodiments, system 100 or parts of system 100 can be integrated with a user computing device as a piece of hardware or software, such as embodied as a plug-in or add-on to a browser. In some embodiments, system 100 is embodied as a specialized computing device. In some embodiments, system 100 can be embodied, for example, as an application, a mobile application, or an online computing service. In some embodiments, system 100 can be a distributed system, for example, each of sequence monitor 110, action manager 120, macro generator 130, and macro manager 140 can be distributed across any number of servers. Regardless of the computing platform on which system 100 is implemented, system 100 can be embodied as a hardware component, a software component, or any combination thereof for automation of sequences of actions of digitized forms.

In other embodiments, systems for automation of sequences of actions can be implemented differently than that depicted in FIG. 1. As an example, macro generator 130 can be combined with macro manager 140 to form a comprehensive component to generate and manage macros. In some embodiments, components depicted in FIG. 1 have a direct or indirect connection not shown in FIG. 1. In this way, the components depicted in FIG. 1 can be connected in any number of ways and are not limited to the connections illustrated in FIG. 1. In some embodiments, some of the components depicted in FIG. 1 are divided into multiple components. Further, one or more components of system 100 can be located across any number of different devices and/or networks. As an example, action manager 120 or macro manager 140 can be implemented as an independent component in a computing cloud.

Figure 2:
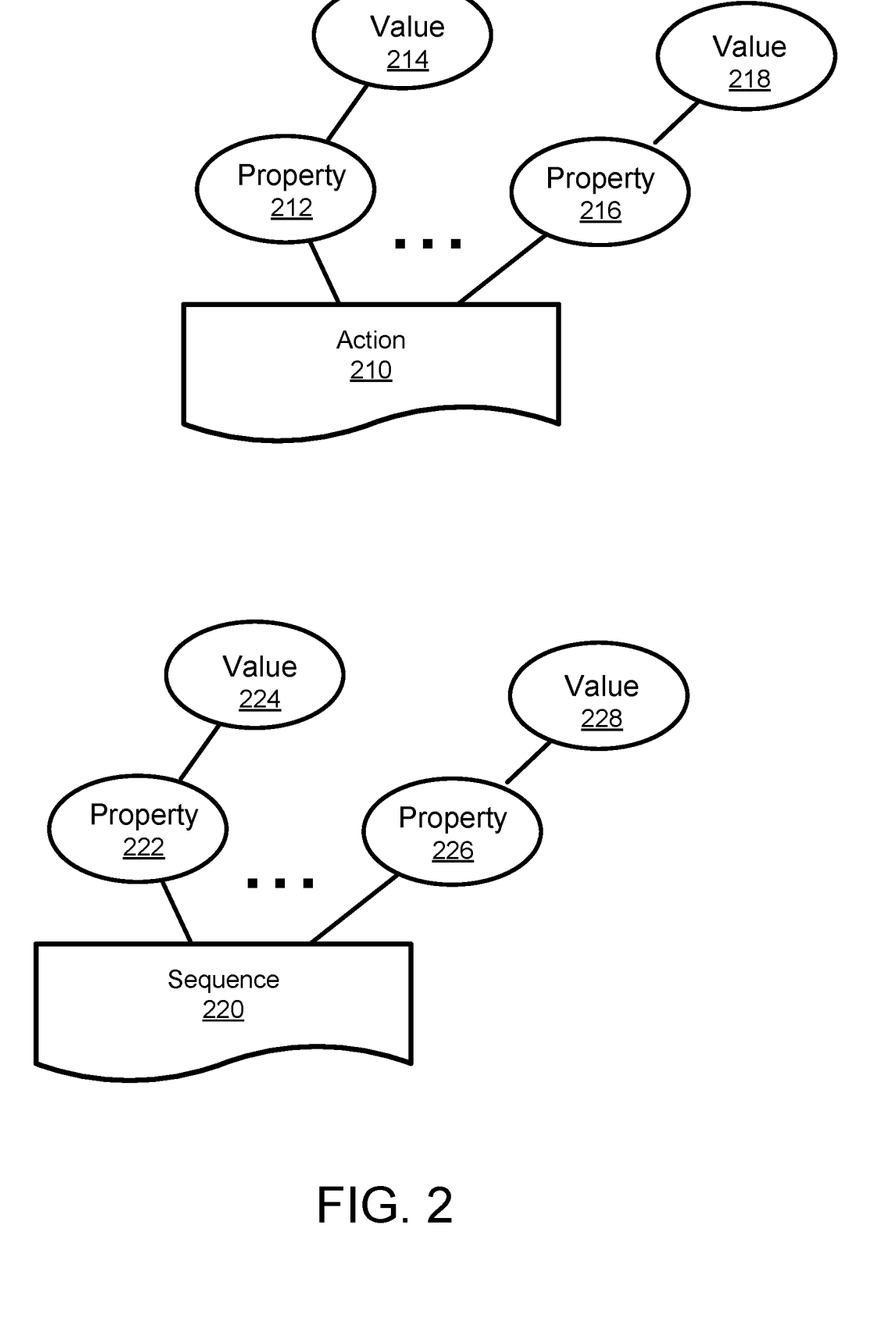
FIG. 2 is a schematic diagram illustrating an example action and an example sequence, incorporating aspects of the present disclosure, in accordance with one embodiment.

FIG. 2 is a schematic diagram illustrating an example action and an example sequence, in accordance with an embodiment of the present disclosure. Action 210 is an operation associated with a user's interaction with system 100 in FIG. 1, such as clicking on a link or button via a user interface interaction, issuing a command via a command console, etc. Action 210 causes the execution of software codes or changes the status of an entity in the computing system.

Sequence 220 is composed of two or more actions, such as action 210. The execution of the chain of actions in sequence 220 will result in a change in the system, such as a status change of an item in the system, e.g., via a database update. Actions in sequence 220 may collectively accomplish a function. A sequence usually has a defined order of the involved actions. Accordingly, two sequences may be differentiated not only based on the actions involved, but also the order of the involved actions. In general, the order of actions in a sequence is important. However, in some embodiments, the order of actions does not affect the function accomplished by the sequence.

Action 210 and its properties, including property 212 and property 216, usually are predefined by system developers for common use cases for general users, or customized use cases for a specific user or a group of users. In one embodiment, action 210 is an operation for photo editing. Property 212 is TOOL, and value 214 is the name of the tool, for instance, rectangular marquee tool, move tool, polygon lasso tool, magic wand tool, crop tool, slice tool, brush tool, clone stamp tool, eraser tool, blur tool, dodge tool, notes tool, zoom tool, etc. Property 216 is WEIGHT, and value 218 is the value of the weight assigned to respective tools.

The weight of an action refers to the complexity of the action. The more complex the action, the higher its weight. The weight of an action is generally assigned by the system, and can be adjusted by users. The complexity of an action refers to the computational complexity in some embodiments. Thus, if an action takes up more computational resources, the system will assign more weight to the action. The complexity of an action refers to the time complexity for users in some embodiments. Thus, if an action will take users more time to complete, the system will assign more weight to the action. The complexity of an action may refer to other aspects in executing the action in other embodiments. In some embodiments, the weight associated with an action may be learned by the system, e.g., via monitoring how the action is executed by users. For example, the system may deduce the weight from the average time users spend on the action. Additionally, although not shown, action 210 may have other properties and corresponding values, such as the brush size for brush tool. In general, the properties and their associated values define the characteristics of an action.

The characteristics of an action will be used, e.g., by sequence monitor 110 or action manager 120, to verify whether the characteristics of a detected operation match the characteristics of a known action. Not every user operation will be confirmed as an recognizable action by action manager 120. For example, some user operations, e.g., clicking on a vacant area, may be rendered as moot. Some user operations, e.g., issuing an unacceptable command, may trigger an error code. In various embodiments, only when the detected operation is recognized by action manager 120 as one of the existing actions, sequence monitor 110 will add the action to a sequence. Various characteristics of the action will then affect the characteristics of the sequence.

Sequence monitor 110 will identify various properties associated with sequence 220. In one embodiment, property 222 is WEIGHT, and value 224 is the value of weight, which refers to the overall complexity of sequence 220. The overall complexity of a sequence may be the sum of complexity scores of every action in the sequence, the average complexity score of all actions in the sequence, the average complexity of unique actions in the sequence, the complexity of the primary action in the sequence, the sum of complexity scores of the first three actions in the sequence, and so forth depending on the implementation.

Property 226 and value 228 may represent the frequency of the sequence being performed by the same user or other users in some embodiments. It will be unnecessary to generate a new macro if the sequence is first encountered by sequence monitor 110. However, if sequence monitor 110 has detected the same sequence multiple times, or more than the frequency threshold set in the system, then sequence monitor 110 will attempt to generate a new macro based on the sequence. The frequency threshold may be set for a single user, a group, or all users in a domain. Accordingly, the macro may be published to the single user, the group, or all users in the domain.

Property 226 and value 228 may represent the duration of the sequence in some embodiments. The duration refers to the execution time of the sequence. If a user can rather quickly complete a sequence in a few seconds, it may be counter-productive to force the user to remember a new macro for the sequence. However, if the duration exceeds the duration threshold, e.g., 10 minutes, then sequence monitor 110 may qualify the sequence to become a new macro. In general, the duration threshold for a multi-user sequence is longer than the duration threshold for a single user. The duration threshold may be set differently for different users.

Additionally, although not shown, sequence 220 may have other properties and corresponding values, such as the location of performing the sequence, the resources required to execute the sequence, the collaborative users involved in the sequence, the project associated with the sequence, the user preference of the user who performed the sequence, and so forth depending on the actual implementation. In general, the properties and their associated values define the characteristics of the sequence.

Figure 3:
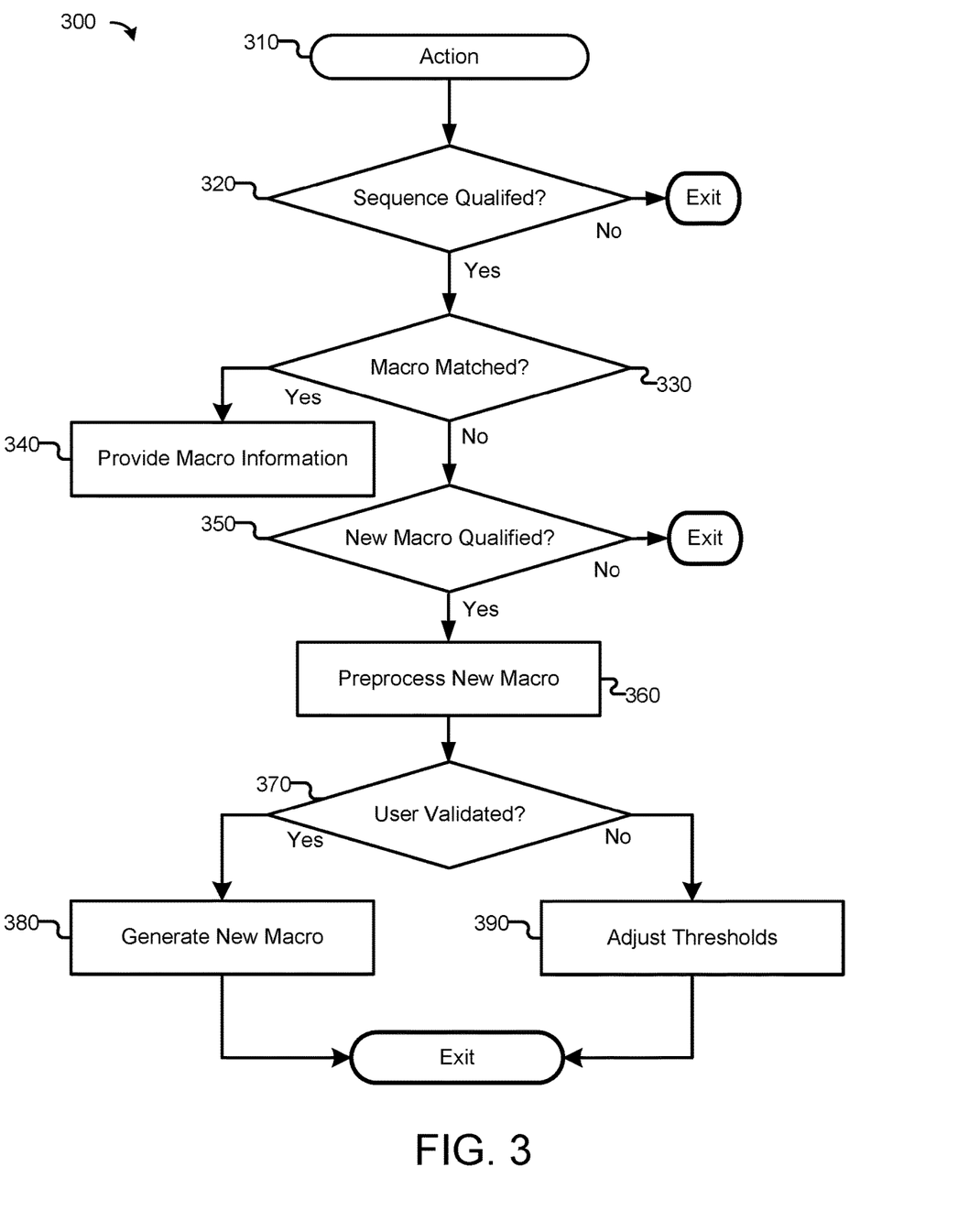
FIG. 3 is a flow diagram of a first example process for automation of a sequence of actions, incorporating aspects of the present disclosure, in accordance with one embodiment.

FIG. 3 is a flow diagram of a first example process 300 for automation of a sequence of actions, incorporating aspects of the present disclosure. In this example process, multiple actions may form a qualified sequence. Similar sequences in a repository will be searched based on the qualified sequence. Further, the sequence will be checked for its qualification to become a new macro. If the sequence passes such qualification scrutiny, a new macro may be generated based on the sequence.

Action 310 is identified, e.g., by action manager 120 as a recognizable action in the system. At block 320, sequence monitor 110 will determine whether action 310 may be added to any monitored sequences. In some embodiments, multiple temporary sequences are being monitored by sequence monitor 110, for instance, for individual users, for different groups, for all users in a domain, etc. Action 310 may be added to one or many temporary sequences. Generally, actions in a sequence are coherent, and two sequential actions should not have conflict. Sequence monitor 110 will conduct a conflict check before adding an action to a temporary sequence in some embodiments. However, if action 310 is not qualified for any temporary sequences, sequence monitor 110 may create a new temporary sequence, starting from action 310. Alternatively, this process may exit.

In some embodiments, action 310 may be added to a temporary sequence based on the user identity associated with action 310. For example, action 310 can be added to the temporary sequence created for the same user or the group including the user identity. In some embodiments, action 310 may be added to a temporary sequence based on the timing, location, or another characteristic of action 310. For example, action 310 can be added to the temporary sequence whose most recent action is close to the timing, location, or the other characteristic of action 310.

After a sequence is added with action 310, sequence monitor 110 will determine whether an existing macro could be found to match with the newly updated sequence at block 330. Two sequences may be compared based at least in part on their cosine similarity score or their edit distance score, as further discussed in FIG. 4. In various embodiments, properties of actions in a sequence and various properties of the sequences (e.g., the order of actions) may be used to evaluate similarities between two sequences.

If an existing macro with a similar sequence is identified, information of the matching macro or macros, such as the description of the macro and the keyboard shortcut of the macro, is provided to the user at block 340. In this way, the user may use the macro if the user confirms the macro accomplishes the function of the sequence.

However, if no matching macro is found, it will be determined at block 350 whether the sequence is qualified to be recorded as a new macro. Thresholds associated with various properties of the sequence, such as the frequency, the duration, and the complexity of a sequence, may be used to determine the qualification for a sequence to be persisted as a macro. To this end, at block 350, the system will determine whether one or more characteristics of the sequence meet respective thresholds for creating new macros. The characteristics of the sequence may include a frequency measurement of the sequence, a duration measurement of the sequence, or a complexity measurement of the sequence. Further, different thresholds may be set up for different sequences, such as for single-user sequences or multi-user sequences. Different thresholds may be set up for different users. A threshold may also be automatically adjusted, e.g., in connection with block 390.

The sequence may be preprocessed into a new macro at block 360 if it is qualified as a candidate for a new macro. The preprocessing process involves prefilling one or more data fields in the macro based at least in part on information of the sequence, such as the properties of the sequence and the properties of the actions in the sequence. By way of example, the preliminary values for the macro title and description may be deduced from the properties of the sequence. Further, a preliminary keyboard shortcut may be proposed by the system based on the properties of the sequence and existing keyboard shortcuts for existing macros.

With the preprocessed information of the macro, such as the auto-generated title, description, and keyboard shortcut, the user will be prompted to validate the new macro at block 370. The user now has a chance to review the proposed macro. The user may adjust the properties of the macro, such as the title, description, or keyboard shortcut. The user may even adjust the actions in the sequence, such as adding, removing, or adjusting the order of an action. In some embodiments, the process may skip block 360 and directly move to block 380 for generating the new macro.

After the user approves the proposal, the new macro may be generated at block 380. The macro generator may assign the final label and description to the new macro based on the properties of the sequence and the properties of actions in the sequence. The macro generator may assign the macro into a menu, which may be invoked via a user interface to prompt users to use macros. The macro generator may assign a keyboard shortcut to the newly generated macro so that a user may invoke the macro quickly.

However, if the user rejects the proposal to generate a new macro, at block 390, the system will adjust one or more thresholds for qualifying a sequence to become a macro. A user may specifically indicate the reason for rejection at block 370, such as because the low frequency of usage of the sequence, the low complexity of the sequence, etc. Accordingly, the system may adjust these thresholds, such as increasing the frequency requirement for generating a new macro for the user.

Figure 4:
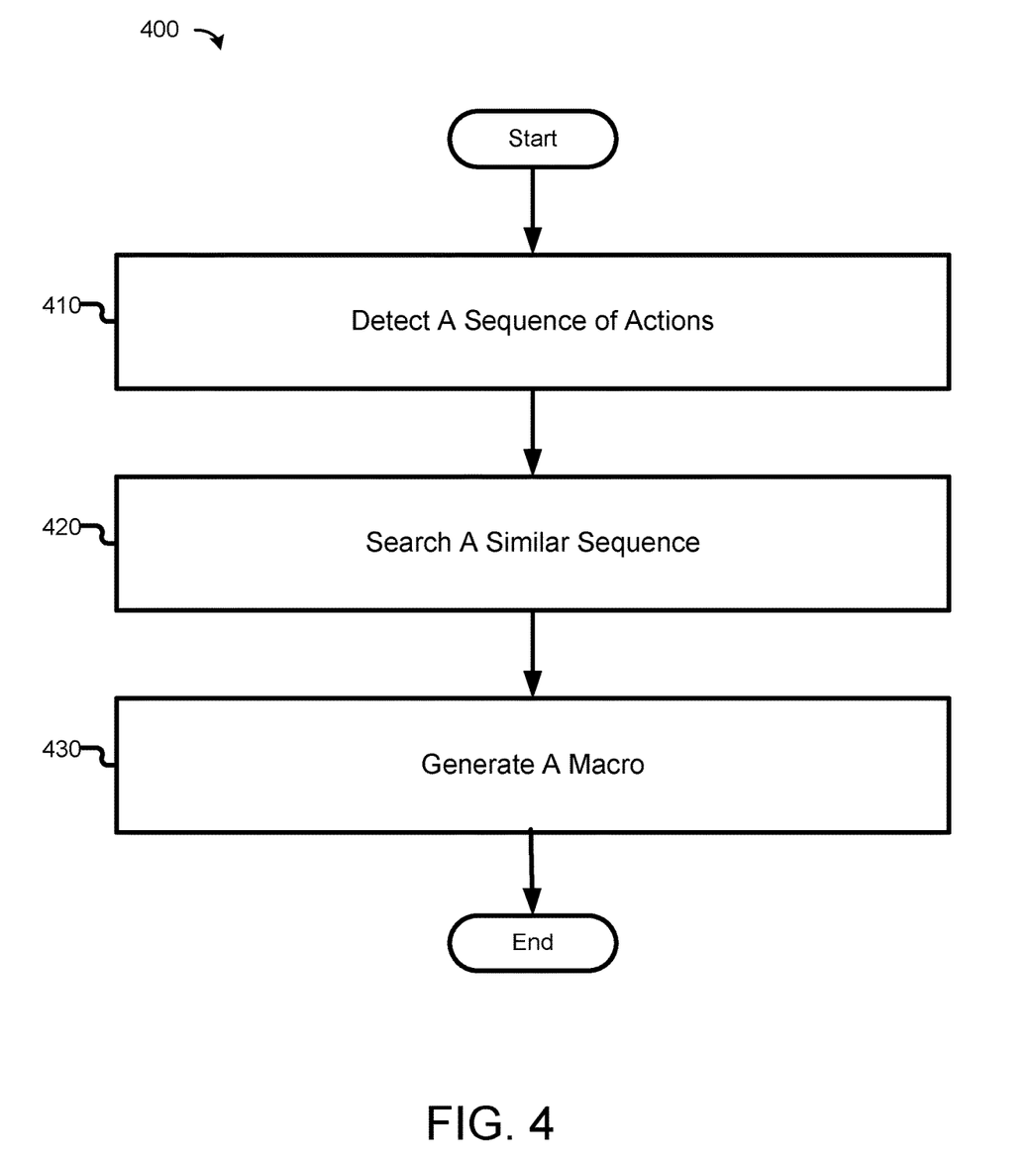
FIG. 4 is a flow diagram of a second example process for automation of a sequence of actions, incorporating aspects of the present disclosure, in accordance with one embodiment.

FIG. 4 is a flow diagram of a second example process for automation of a sequence of actions, incorporating aspects of the present disclosure. Process 400 can be performed, for example, by a system for automation of sequences of actions, e.g., system 100 of FIG. 1. Process 400 can be performed by processing logic that comprises hardware (e.g., circuitry, dedicated logic, programmable logic, microcode, etc.), software (e.g., instructions run on a processing device to perform hardware simulation), or a combination thereof. The processing logic can be configured to automate sequences of actions as macros. It will also be appreciated that, in various embodiments, process 400 can have fewer or additional operations than those depicted, or perform some of the depicted operations in a different order without departing from the scope of this disclosure.

In various embodiments, the process begins at block 410, where a sequence of actions is detected, e.g., enabled by sequence monitor 110 of FIG. 1. A sequence includes two or more actions. When a user operation is detected, action manager 120 will verify whether the detected operation is a recognizable action in the system. To accomplish this, action manager 120 can compare the characteristics of the detected user operation with the characteristics of the known action. The characteristics of the detected user operation may include the identity of the user, the timestamp, the location, or the nature of the operation (e.g., which button is being clicked).

Once the user operation is determined to be an action, sequence monitor 110 will either add the newly detected action to an existing pending sequence or build a new sequence from the newly detected action. When multiple pending sequences are being monitored for individual users or different groups, sequence monitor 110 may add the newly detected action to one or more pending sequences, e.g., based on the relationship between the newly detected action and the pending sequences. However, if the newly detected action is incompatible with any pending sequences, sequence monitor 110 may create a new sequence, e.g., starting from the newly detected action.

After the newly detected action is added to a sequence, sequence monitor 110 will update the properties of the sequence. In some embodiments, sequence monitor 110 will determine the order of actions in the sequence, e.g., based on the timestamps associated with the actions, or the natural order for adding the actions. Sequence monitor 110 may retrieve various properties of involved actions and determine corresponding properties for the sequence. By way of example, the sum of complexity or the average complexity of the sequence may be determined based on the complexity score of each action. The complexity score or weight of an action may be predetermined and stored as a property of the action. In some embodiments, the complexity score of an action may be dynamically determined, e.g., based at least in part on a duration to perform the action by the user or another user. By way of example, the complexity score may be set to be positively correlated with the duration. For instance, the longer it takes for the user to complete the action, the higher a complexity score may be assigned to the action. Other properties of the sequence may also be determined at this stage.

At block 420, a macro repository may be searched for macros with similar sequences of actions as the newly formed sequence, e.g., by macro manager 140 of FIG. 1. Different search mechanisms may be used in different embodiments. A particular search mechanism may use one or more similarity measurements to compare two sequences based at least in part on a characteristic of the sequence to be searched, which includes the actions in the sequence, the order of the actions, the complexity of the sequence, the primary action in the action, etc.

In some embodiments, a complete match is required. In this case, the actions and their order in two sequences have to match completely. Further restrictions may be required in some embodiments, such as the user privilege match, the user group match, etc., in addition to a match for the actions. In some embodiments, to accelerate the search process, the initial search may be based at least in part on the sum of complexity scores or the average complexity score of all actions in the sequence. If the sum of complexity scores or the average complexity score of all actions in a sequence deviates significantly from the sequence to be searched, they will unlikely be a complete match.

In some embodiments, an inclusion match is required. In this case, one sequence is required to contain the other sequence. If the first sequence contains every action in the second sequence, the first sequence is said to contain the second sequence. The order of actions may or may not matter. In one embodiment, the first sequence must contain the second sequence with the same order of actions.

In some embodiments, a primary action is identified for a sequence and saved as a property of the sequence. The primary action usually is the action with the highest complexity. The search process may be based at least in part on the primary action. By way of example, the search process may exclude all sequences without the primary action from the search space. In some embodiments, the similarity between two sequences is determined based on their cosine similarity score. The cosine similarity score is the cosine of the angle between two non-zero vectors of a vector space. Each action is notionally assigned a different dimension. A sequence is characterized by a vector with different actions as different dimensions in the vector space. The value of each dimension corresponds in part to the number of times that action appears in the sequence in some embodiments. In some embodiments, the similarity between two sequences is determined based at least in part on the complexity of actions in the sequence to be searched. In this case, the value of each dimension in the vector space also corresponds in part to the complexity score of the action. Accordingly, the cosine similarity score provides a useful measure of how similar two sequences are likely to be in terms of the involved actions.

In some embodiments, the similarity between two sequences is determined based on their edit distance. The edit distance, as used herein, is to quantify how similar two sequences are to one another by counting the minimum number of operations required to transform one sequence into the other. A shorter edit distance denotes that two sequences are closer because it takes fewer operations to transform one sequence into the other.

In various embodiments, the similarity between two sequences is determined based at least in part on the order of actions in the sequence to be searched. By way of example, the similarity measurement based on edit distance inherently considers the order of actions in a sequence. In other similarity measures, the order of actions in a sequence may be specifically emphasized in computing the final similarity score. By way of example, the cosine similarity measurement does not directly consider the order of actions. Thus, in one embodiment, the cosine similarity measurement is used in conjunction with the edit distance measure. The top rated sequences with high cosine similarity scores may be selected as initial candidates; these top rated sequences may be re-ranked based on the edit distance score. In this way, the process may reduce the computational complexity and consider both similarity measures in a final mixed similarity score.

If a macro is found to contain the sequence to be searched, such as if the similarity measurement between the sequence in a macro and the sequence to be searched is above a similarity threshold, the system may subsequently provide information of the macro to the user. Otherwise, the process may move to block 430 to automatically generate a macro.

Next, at block 430, a new macro may be generated for the sequence, e.g., by macro generator 130 of FIG. 1. Macro generator 130 can deduce various metadata based at least in part on information of the sequence, such as the properties of the sequence and the properties of the actions in the sequence. By way of example, the title of the sequence may be used as the title of the macro. The primary action of the sequence may be emphasized in the description of the macro.

In various embodiments, macro generator 130 will optimize the sequence to be encoded into the macro. By way of example, the user may have used a brush tool to paint an area multiple times until the area is filled up with the selected color or pattern. Macro generator 130 may synthesize these similar actions into one action to fill up the area with the selected color or pattern. Further, based on some predefined rules, macro generator 130 may optimize the actions in the sequence, such as addition, deletion, or reorganization. By way of example, if action P should always be followed by action Q, but the sequence misses Q. In this case, macro generator 130 will insert action Q into the sequence. As another example, macro generator 130 may identify a portion of the sequence that is functionally equivalent to another macro, and that macro has other advantages. In this case, macro generator 130 may substitute the portion of the sequence with the sequence in that macro. In this way, the automatically generated macro may be optimized to an extent.

Figure 5:
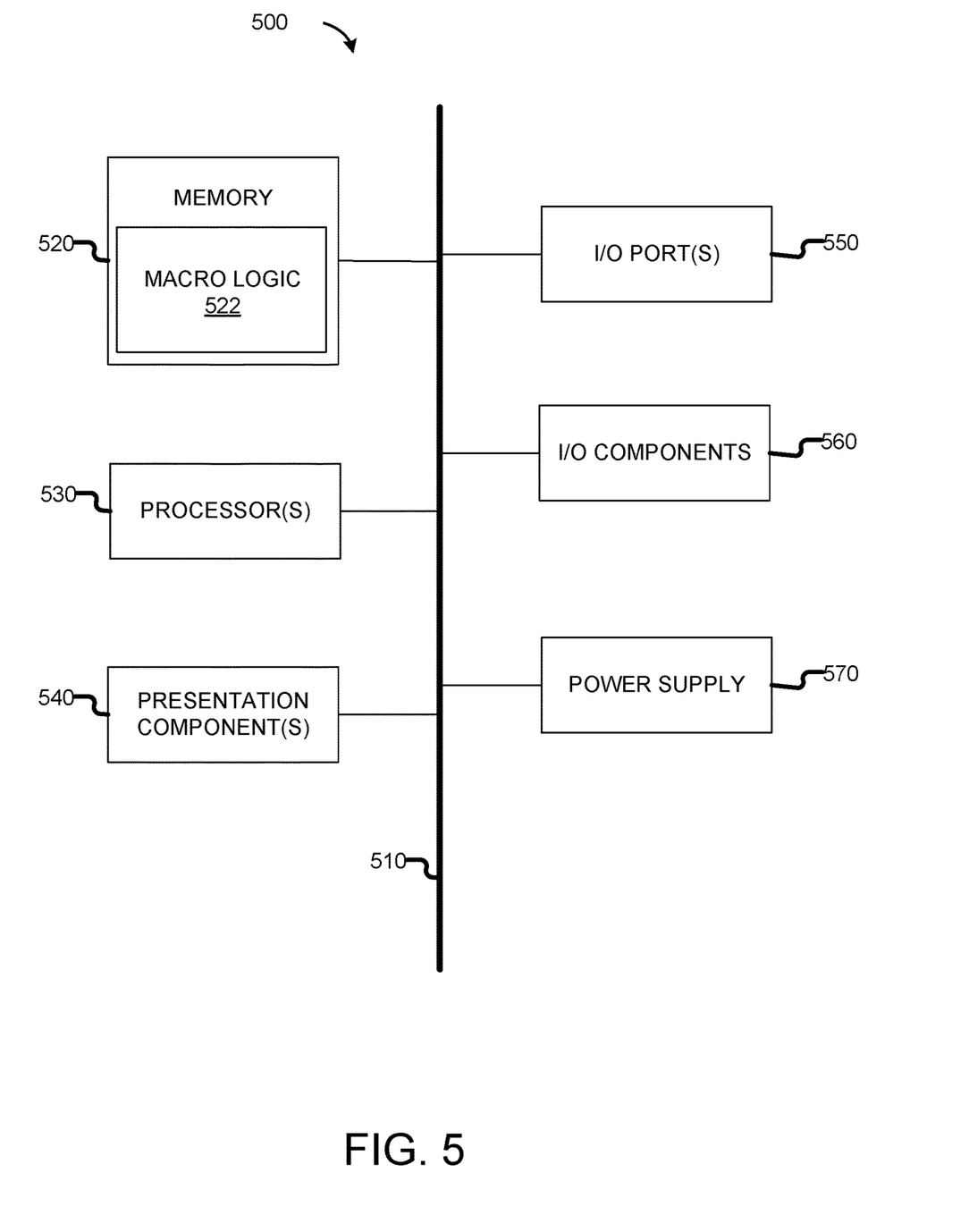
FIG. 5 illustrates an example computing device suitable for practicing the disclosed embodiments, in accordance with one embodiment.

Having briefly described an overview of embodiments of the present invention, an exemplary operating environment in which embodiments of the present invention is to be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The disclosure is described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The embodiments of this disclosure are to be practiced in a variety of system configurations, including handheld devices, consumer electronics, general-purpose computers, more specialty computing devices, etc. The embodiments of this disclosure are to be practiced in distributed computing environments where tasks are performed by remote-processing devices that are linked through a communications network.

With reference to FIG. 5, computing device 500 includes a bus 510 that directly or indirectly couples the following devices: memory 520, one or more processors 530, one or more presentation components 540, input/output (I/O) ports 550, input/output (I/O) components 560, and an illustrative power supply 570. Bus 510 represents one or more busses (such as an address bus, data bus, or combination thereof). Although the various blocks of FIG. 5 are shown with lines for the sake of clarity, in reality, delineating various components is not so clear, and metaphorically, the lines would more accurately be fuzzy. For example, a presentation component such as a display device could also be considered as an I/O component. Also, processors have memory. The inventor recognizes that such is the nature of the art, and reiterates that the diagram of FIG. 5 is merely illustrative of an exemplary computing device that is used in connection with one or more embodiments of the present invention. Distinction is not made between such categories as "workstation," "server," "laptop," "handheld device," etc., as all are contemplated within the scope of FIG. 5 and reference to "computing device."

Computing device 500 typically includes a variety of computer-readable media. Computer-readable media include any available media to be accessed by computing device 500, and include both volatile and nonvolatile media, and removable and non-removable media. By way of example, and not limitation, computer-readable media comprises computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which is used to store the desired information and which is accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 520 includes computer storage media in the form of volatile and/or nonvolatile memory. In various embodiments, the memory is removable, non-removable, or a combination thereof. Exemplary hardware devices include solid-state memory, hard drives, optical-disc drives, etc. Computing device 500 includes one or more processors 530 that read data from various entities such as memory 520 or I/O components 560. Presentation component(s) 540 present data indications to a user or other device. Exemplary presentation components include a display device, speaker, printing component, vibrating component, etc.

In various embodiments, memory 520 includes, in particular, temporal and persistent copies of macro logic 522. Macro logic 522 includes instructions that, when executed by one or more processors 530, result in computing device 500 to evaluate conversion quality of a form or a form object, such as, but not limited to, process 300 or process 400. In various embodiments, macro logic 522 includes instructions that, when executed by processors 530, result in computing device 500 performing various functions associated with, but not limited to, sequence monitor 110, action manager 120, macro generator 130, or macro manager 140, in connection with FIG. 1.

In some embodiments, one or more processors 530 are to be packaged together with macro logic 522. In some embodiments, one or more processors 530 are to be packaged together with macro logic 522 to form a System in Package (SiP). In some embodiments, one or more processors 530 are integrated on the same die with macro logic 522. In some embodiments, processors 530 are integrated on the same die with macro logic 522 to form a System on Chip (SoC).

I/O ports 550 allow computing device 500 to be logically coupled to other devices including I/O components 560, some of which are built-in components. Illustrative components include a microphone, joystick, game pad, satellite dish, scanner, printer, wireless device, etc. In some embodiments, the I/O components 560 also provide a natural user interface (NUI) that processes air gestures, voice, or other physiological inputs generated by a user. In some embodiments, inputs are to be transmitted to an appropriate network element for further processing. An NUI implements any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 is equipped with depth cameras, such as stereoscopic camera systems, infrared camera systems, RGB camera systems, touchscreen technology, and combinations of these, for gesture detection and recognition. Additionally, the computing device 500 is equipped with accelerometers or gyroscopes that enable detection of motion. The output of the accelerometers or gyroscopes is to be provided to the display of the computing device 500 to render immersive augmented reality or virtual reality.

Although certain embodiments have been illustrated and described herein for purposes of description, a wide variety of alternate and/or equivalent embodiments or implementations calculated to achieve the same purposes could be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A computer-implemented method, comprising:
   identifying, by a processor, respective complexity scores of a sequence of computer operations performed by a user on a computing system;
   searching, by the processor, a repository of existing macros using a characteristic generated from the respective complexity scores of the sequence of computer operations to determine if there is an existing macro with the characteristic in the repository; and
   in response to determining, from the searching, that the repository has no existing macros with the characteristic, generating a macro based on the sequence of computer operations.

2. The method of claim 1, wherein identifying the respective complexity scores comprises identifying a complexity score of a computer operation based on computational resources used in the computer operation.

3. The method of claim 1, wherein identifying the respective complexity scores comprises identifying a complexity score of a computer operation based on an execution time of the computer operation.

4. The method of claim 1, wherein identifying the respective complexity scores comprises assigning a higher complexity score to the sequence of computer operations in response to multiple users being involved in the sequence of computer operations.

5. The method of claim 1, wherein the characteristic comprises an overall complexity score of the sequence of computer operations, the method further comprising:
   determining the overall complexity score of the sequence of computer operations based on a sum of the respective complexity scores.

6. The method of claim 1, wherein the characteristic comprises an overall complexity score of the sequence of computer operations, the method further comprising:
   determining the overall complexity score of the sequence of computer operations based on an average of the respective complexity scores.

7. The method of claim 1, further comprising:
   identifying a plurality of unique operations among the sequence of computer operations; and
   determining the characteristic based on an average complexity score of the plurality of unique operations.

8. The method of claim 1, further comprising:
   identifying a primary operation among the sequence of computer operations; and
   determining the characteristic based on a complexity score of the primary operation.

9. The method of claim 1, further comprising:
   identifying a first three operations among the sequence of computer operations; and
   determining the characteristic based on respective complexity scores of the first three operations.

10. A non-transitory computer-readable storage medium comprising computer-implemented instructions that, when used by one or more computing devices, cause the one or more computing devices to:
    identify respective complexity scores of a sequence of computer operations performed by a user on a computing system;
    in response to a characteristic generated from the respective complexity scores of the sequence of computer operations meeting a threshold, search a repository of existing macros using the characteristic to determine if there is an existing macro with the characteristic in the repository; and
    in response to determining, form the searching, that the repository has no existing macros with the characteristic, generate a macro based on the sequence of computer operations.

11. The non-transitory computer-readable storage medium of claim 10, the instructions further cause the one or more computing devices to:
    determine computational resources used in a computer operation of the sequence of computer operations; and
    identify a complexity score of the computer operation based on the computational resources.

12. The non-transitory computer-readable storage medium of claim 10, the instructions further cause the one or more computing devices to:
    determine an execution time of a computer operation of the sequence of computer operations; and
    identify a complexity score of the computer operation based on the execution time.

13. The non-transitory computer-readable storage medium of claim 10, wherein the characteristic comprises an overall complexity score of the sequence of computer operations, and the threshold comprises a minimum complexity score, the instructions further cause the one or more computing devices to:
    computer the overall complexity score of the sequence of computer operations based on a sum of the respective complexity scores; and
    determine whether the overall complexity score of the sequence of computer operations exceeds the minimum complexity score.

14. The non-transitory computer-readable storage medium of claim 10, wherein the characteristic comprises an average complexity score of the sequence of computer operations, and the threshold comprises a minimum complexity score, the instructions further cause the one or more computing devices to:
    computer the average complexity score of the sequence of computer operations based on an average of the respective complexity scores; and
    determine whether the average complexity score of the sequence of computer operations exceeds the minimum complexity score.

15. The non-transitory computer-readable storage medium of claim 10, the instructions further cause the one or more computing devices to:

identify a plurality of unique operations among the sequence of computer operations; and
determine the characteristic based on an average of respective complexity scores of the plurality of unique operations.

16. The non-transitory computer-readable storage medium of claim 10, the instructions further cause the one or more computing devices to:
identify a primary operation among the sequence of computer operations; and
determine the characteristic based on a complexity score of the primary operation.

17. The non-transitory computer-readable storage medium of claim 10, the instructions further cause the one or more computing devices to:
identify an execution order of the sequence of computer operations; and
determine the characteristic based on the execution order and the respective complexity scores of sequence of computer operations.

18. A computer system, comprising:
means for identifying respective complexity scores of a sequence of computer operations performed by a user on a computing system;
means for searching a repository of existing macros using a characteristic generated from the respective complexity scores of the sequence of computer operations to determine if there is an existing macro with the characteristic in the repository; and
means for in response to determining, from the searching, that the repository has no existing macros with the characteristic, generating a macro based on the sequence of computer operations.

19. The computer system of claim 18, wherein the characteristic comprises a sum of the respective complexity scores.

20. The computer system of claim 18, wherein the characteristic comprises an average of the respective complexity scores.

* * * * *

UNITED STATES PATENT AND TRADEMARK OFFICE
CERTIFICATE OF CORRECTION

| | |
|---|---|
| PATENT NO. | : 11,422,814 B2 |
| APPLICATION NO. | : 17/038525 |
| DATED | : August 23, 2022 |
| INVENTOR(S) | : Patrick Fauchere and Christian Meyer |

It is certified that error appears in the above-identified patent and that said Letters Patent is hereby corrected as shown below:

In the Claims

Claim 10, Column 16, Line 23:
The line reading "in response to determining, form the searching, that the" should read -- in response to determining, from the searching, that the --.

Claim 13, Column 16, Line 47:
The line reading "computer the overall complexity score of the sequence of" should read -- compute the overall complexity score of the sequence of --.

Claim 14, Column 16, Line 59:
The line reading "computer the overall complexity score of the sequence of" should read -- compute the overall complexity score of the sequence of --.

Signed and Sealed this
Fifteenth Day of November, 2022

Katherine Kelly Vidal
*Director of the United States Patent and Trademark Office*